(12) United States Patent
Tan et al.

(10) Patent No.: US 7,274,718 B2
(45) Date of Patent: Sep. 25, 2007

(54) ELECTRONIC ALIGNMENT OF ACOUSTO-OPTIC MODULATOR FOR MODULATING A LASER

(75) Inventors: Chinh Tan, Setauket, NY (US); Carl Wittenberg, Water Mill, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 413 days.

(21) Appl. No.: 10/883,464

(22) Filed: Jun. 30, 2004

(65) Prior Publication Data

US 2005/0157763 A1 Jul. 21, 2005

(51) Int. Cl.
*H01S 3/10* (2006.01)
(52) U.S. Cl. .................. 372/26; 372/28; 372/29.011
(58) Field of Classification Search .................. 372/26, 372/28, 29.011
See application file for complete search history.

(56) References Cited

U.S. PATENT DOCUMENTS 4,503,388 A * 3/1985 Zehl et al. ............... 324/76.37

4,938,554 A 7/1990 Wilson et al.

FOREIGN PATENT DOCUMENTS

| JP | 54-31762 | 3/1979 |
| JP | 54-85744 | 7/1979 |
| JP | 2-143579 | 6/1990 |

* cited by examiner

*Primary Examiner*—Dung Nguyen
(74) *Attorney, Agent, or Firm*—Kirschstein et al.

(57) ABSTRACT

A method and apparatus are provided to modulate a beam of laser light. An acousto-optic modulator (AOM) is positioned to receive continuous-wave (CW) laser light at an angle approximating the Bragg angle. Fine tuning of the modulation is then used to compensate for any variations in the actual angle from the Bragg angle. A photodiode provides a feedback signal that may be used to tune or adjust the operation of the AOM. The photodiode is positioned to receive laser light at the first order diffraction and provide a signal indicative of the magnitude of the first order diffraction laser light produced by the AOM. The photodiode signal is coupled to an RF frequency generator so that the RF frequency may be adjusted to vary the acoustic wave in the AOM to compensate for any variations in the Bragg angle.

23 Claims, 3 Drawing Sheets

ELECTRONIC ALIGNMENT OF ACOUSTO-OPTIC MODULATOR FOR MODULATING A LASER

BACKGROUND OF THE INVENTION

1. Field of the Invention

This invention relates generally to electronic displays, and, more particularly, to a multi-color Laser Projection Display (LPD).

2. Description of the Related Art

Single-color or monochrome LPDs have been implemented using a raster-based scanning system. A raster-based LPD uses a laser and oscillating mirror(s) that move in horizontal and vertical directions to scan the laser light over a viewing screen in a raster pattern. By controllably modulating the laser in time with the movements of the mirror(s), a two-dimensional image can be produced. In fact, the LPD can produce a high quality image, such as VGA or higher resolution by modulating the mirrors at frequencies in the range of 110's and 100's of MHz.

Monochrome displays, however, have limited utility, whereas full color displays are in wide use and are desired and accepted by the general public. Full-color LPDs may be produced by controllably combining red, blue and green laser light to produce a wide spectrum of colors. Generally, red, blue and green lasers are commercially available, but not in small-form factors, such as semiconductor laser diodes. In fact, while semiconductor laser diodes that emit in red and blue wavelengths are available and can be directly modulated, there is no commercially available semiconductor laser that emits in the green wavelength. It is advantageous to use a green laser since having red, green, and blue wavelengths enable a true full-color display. Also, human vision is more sensitive to green. Thus, for the same emitted laser power, a brighter display is perceived if green laser light is included.

The present invention is directed to overcoming, or at least reducing, the effects of one or more of the problems set forth above.

SUMMARY OF THE INVENTION

In one aspect of the instant invention, a method is provided for modulating laser light. The method comprises delivering laser light to an optic modulator at an angle generally incident at the Bragg angle relative to the optic modulator and adjusting the operation of the optic modulator to compensate for at least a portion of a deviation of the laser light from the Bragg angle.

In another aspect of the instant invention, a method is provided for modulating laser light. The method comprises delivering laser light to an optic modulator at an angle generally incident at the Bragg angle relative to the optic modulator and adjusting the optic modulator to produce a desired characteristic of laser light of at least one ordered diffraction.

In yet another aspect of the instant invention, an apparatus is provided for modulating laser light. The apparatus comprises a source of laser light, an optic modulator, a sensor and a controller. The optic modulator is arranged to receive laser light at an angle generally incident at the Bragg angle relative to the optic modulator. The sensor is adapted to measure a characteristic of laser light of at least one ordered diffraction produced by the optic modulator. The controller is adapted to adjust the operation of the optic modulator to compensate for at least a portion of a deviation of the laser light from the Bragg angle.

BRIEF DESCRIPTION OF THE DRAWINGS

The invention may be understood by reference to the following description taken in conjunction with the accompanying drawings, in which like reference numerals identify like elements, and in which.

Figure 1:
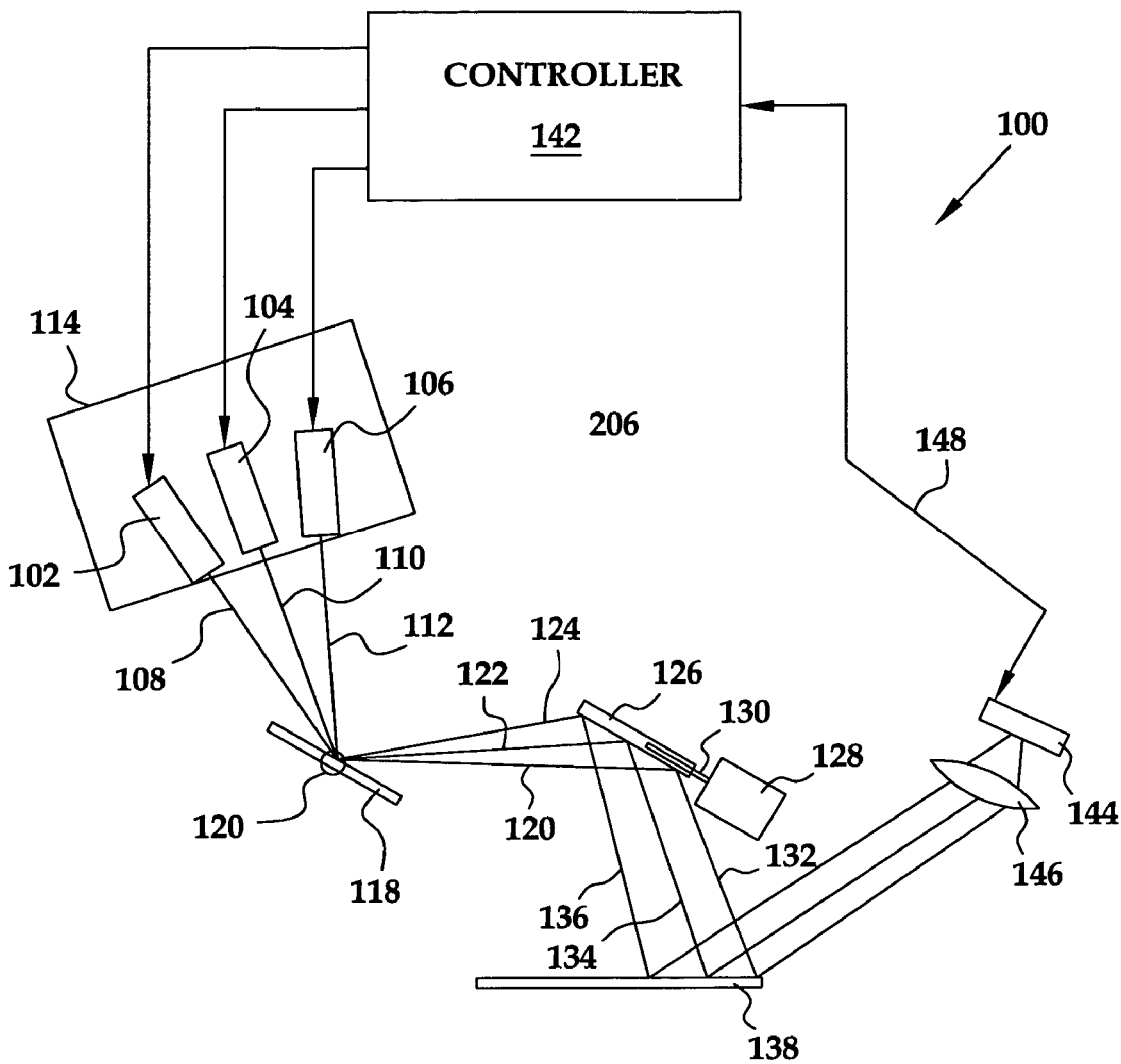
FIG. 1 is a stylistic block diagram of a top level view of one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis 120 at a relatively high rate (e.g., about 20-30 KHz). Rotation or oscillation of the first scanning mirror 118 causes the beams of light 108, 110, 112 to be moved. That is, as the angular position of the first scanning mirror 118 alters, so to does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
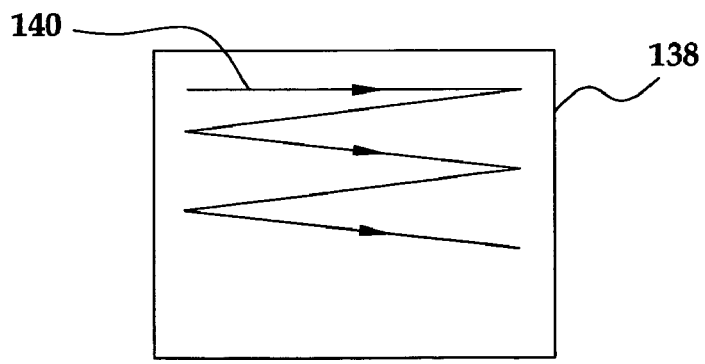
FIG. 2 is a stylistic view of a viewing surface shown in FIG. 1.

The second mirror 126 oscillates or rotates at a relatively slow rate, as compared to the rate of the first mirror 118 (e.g., about 60 Hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
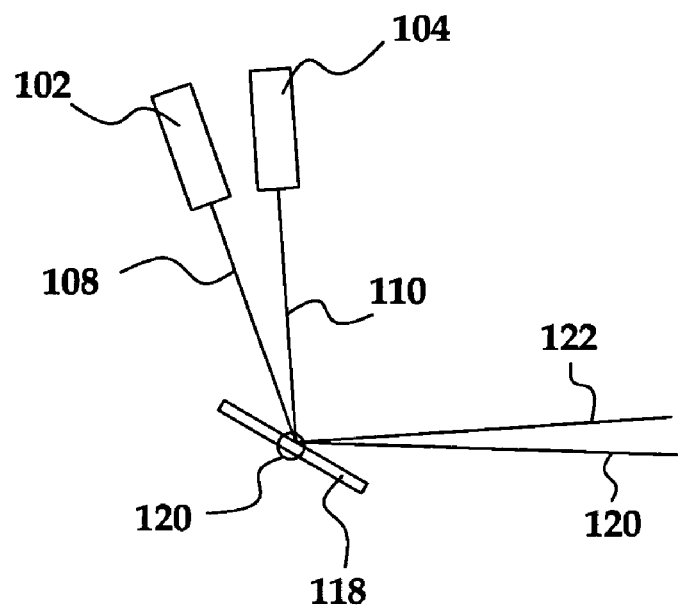
FIGS. 3A and 3B depict a top view of a scanning device at various times during its operation.
Figure 3B:
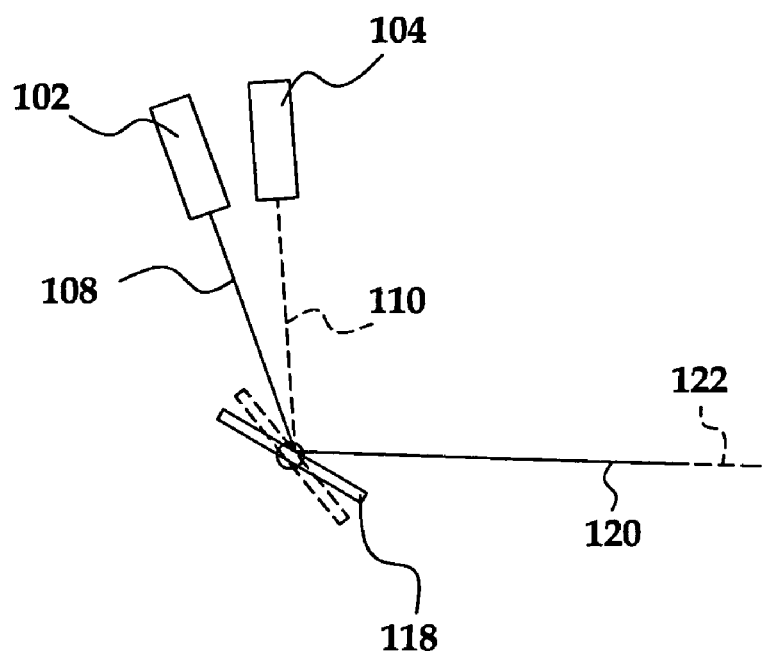

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

As discussed above, semiconductor laser diodes that emit in red and blue wavelengths are commercially available and can be used directly as the lasers 102, 104 to produce beams of red and blue laser light in the raster based system described above. A small form factor laser capable of producing a green beam of laser light has heretofore been generally unavailable. Continuous-wave (CW) green laser light has been created by frequency-doubling an Nd:YAG or Nd:YVO4 infrared solid-state laser; however, the relaxation lifetime of such solid-state lasers may be too slow for some laser display applications. That is, these frequency doubled lasers may not be modulated sufficiently fast to produce a high resolution display. The instant invention, however, demonstrate that it is possible to modulate an infrared semiconductor laser diode to create displays of red, green or blue colors.

Figure 4:
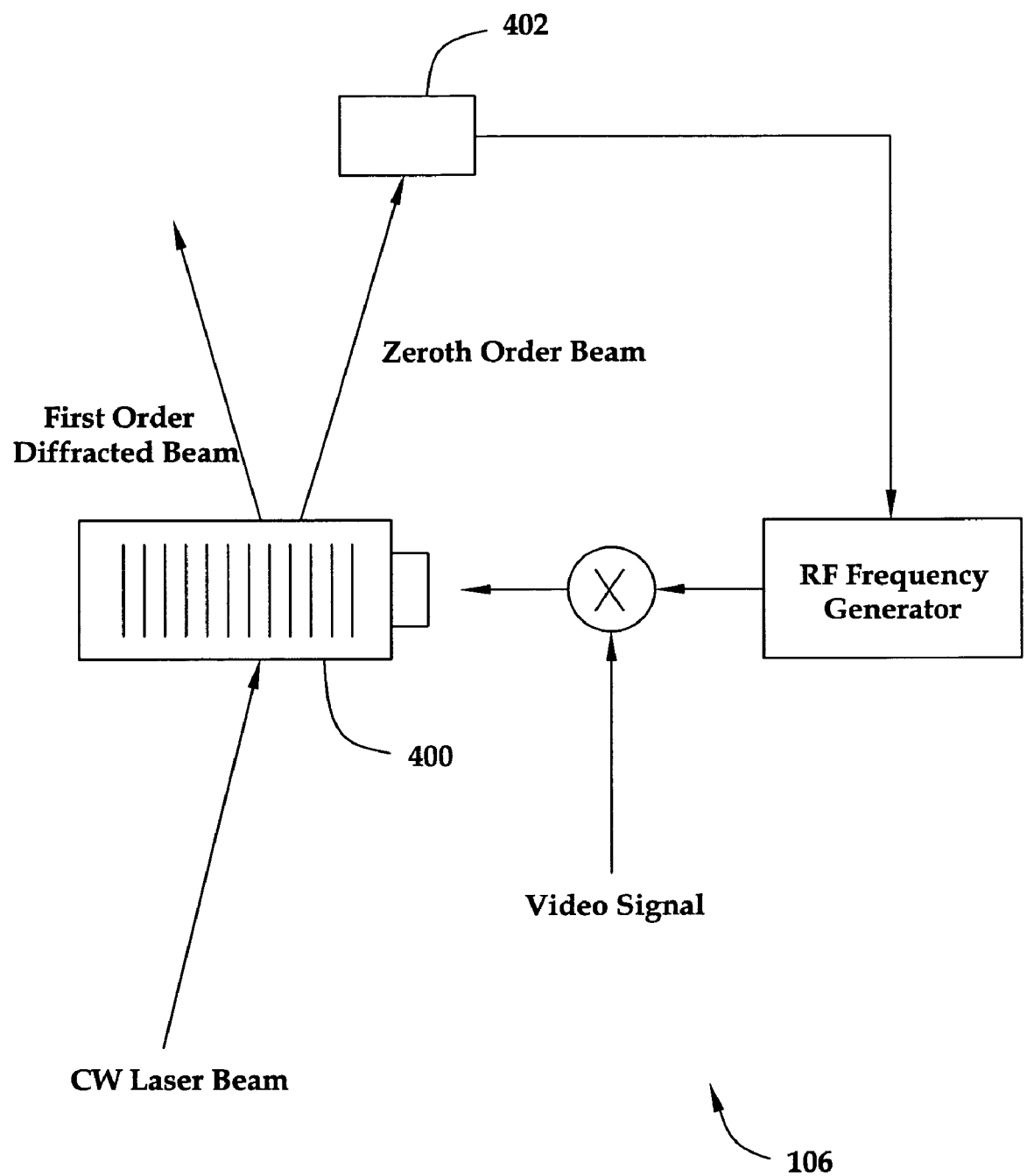
FIG. 4 depicts one embodiment of an alignment set up using a photodiode to measure the power in the diffracted laser beam, and using the photodiode signal to tune the RF frequency.

FIG. 4 illustrates a block diagram of one embodiment of the laser 106 arranged to produce green laser light. Generally, an acousto-optic modulator (AOM) 400 may be configured to modulate a CW laser beam, such that green laser light may be produced.

The laser beam may be arranged to be generally incident at the Bragg angle to the AOM 400. The interaction of the acoustic waves in the AOM, 400 generated by an RF frequency, and the laser beam creates diffraction orders. The diffracted laser beam is thus modulated. For example, when the AOM 400 is producing an acoustic signal and modulating the laser beam, the various diffraction orders are produced. However, when the AOM 400 is not modulating the laser beam (e.g., no acoustic signal is present), then the various diffraction orders are not present (except for the $0^{th}$ order). That is, the various diffraction orders may be turned "off and on," producing a modulated laser beam. Those skilled in the art will appreciate that while any of various diffracation orders may be utilized, the first order diffraction typically contains the most energy, and thus, is normally the ordered diffraction that is utilized by the system.

The Bragg relationship is captured by the following expression:

$$\theta_{Bragg} = \lambda f_c / 2 V_a$$

where $\theta_{Bragg}$ is the Bragg angle and is typically on the order of 1 degree, λ is the laser wavelength, $f_c$ is the RF frequency that generates the acoustic wave, and $V_a$ is the speed of the acoustic wave in the AOM medium.

To ensure high diffraction efficiency, the AOM may be generally aligned to an accuracy of about $\frac{1}{10}^{th}$, of the Bragg angle or 0.1 degrees, or less. A mechanical alignment system capable of this level of accuracy may be difficult to achieve and maintain in a consumer display product. At a minimum, the mechanical alignment mechanism would add size and cost to the product. Moreover, the quality of the alignment may vary over time or even with changes in temperature and/or humidity. In any event, such a mechanical system would likely prove to be rather delicate, limiting its application to laboratory type environments.

Instead of fine aligning the AOM 400 to the laser beam mechanically, it is possible to tune the required Bragg angle to match the existing alignment of the laser/AOM assembly by changing the RF frequency that generates the acoustic wave within the AOM 400. That is, by fine tuning the RF frequency applied to the AOM 400, the operation of the AOM 400 may be adjusted to compensate for any misalignment between the AOM 400 and the laser beam. The Bragg angle changes linearly to the RF frequency, as is evident by the above expression.

FIG. 4 shows one embodiment of an alignment set up using a photodiode 402 to measure the power in the diffracted laser beam. The photodiode signal is coupled to an RF frequency generator 404, which is preset to produce a generally desired RF frequency signal. The photodiode signal operates to fine tune the RF frequency to compensate for any variations in the Bragg angle. The RF frequency can be tuned by various well known structures, such as capacitance or inductance tuning, or a voltage controlled oscillator. The photodiode 402 may be positioned to receive one or more of the ordered beams produced by the AOM 400. If the photodiode 402 is positioned to capture the signal in the zeroth order beam (as shown), which is a modulated version of the incident laser beam along its path of propagation, the control loop is configured to stop fine tuning the RF frequency generator 404 when minimum power is measured by the photodiode 402. If the photodiode is positioned to capture the $1^{st}$ order diffracted beam, which is usually the beam used for display, the control loop stops adjusting the RF frequency generator 404 when maximum power is measured by the photodiode 402.

Thus, the electronic tuning of the Bragg angle at best can reduce or eliminate fine mechanical alignment. At the minimum, it provides an additional adjustment for the alignment procedure.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for electronically aligning a laser beam with an acousto-optical modulator (AOM), comprising:

a) means for directing the laser beam at an incident angle relative to a longitudinal axis of the AOM for exit from the AOM as a zero order beam having a beam intensity;

b) an acoustic drive for conducting to the AOM an acoustic drive signal having a drive amplitude and a drive frequency to generate in the AOM a plurality of acoustic planar waves for deflecting and diffracting the laser beam incident on the AOM as a first order beam having a beam intensity at a deflection angle relative to the longitudinal axis; and c) means for electronically adjusting the incident angle to be a Bragg angle for diffraction efficiency, including a detector for detecting the beam intensity of at least one of the order beams, and for electronically changing the drive frequency of the acoustic drive signal and, in turn, the Bragg angle as a function of the beam intensity detected by the detector, the detector being operative for detecting the beam intensity of the zero order beam and stops changing the drive frequency when a minimum of the beam intensity of the zero order beam is detected.

2. The arrangement of claim 1, wherein the directing means includes a laser for emitting the laser beam at a wavelength corresponding to a green color.

3. arrangement of claim 2, wherein the laser is a frequency-doubled, infrared laser.

4. The arrangement of claim 1, wherein the acoustic drive includes a radio frequency (RF) generator for generating the drive frequency of the acoustic drive signal as an RF frequency of an RF drive signal.

5. The arrangement of claim 1, wherein the Bragg angle is linearly related to the drive frequency of the acoustic drive signal.

6. The arrangement of claim 1, wherein the drive frequency is set to an initial value; wherein the detector is operative for detecting an initial value of the beam intensity of the at least one of the beams; wherein the initial values set the incident angle as the Bragg angle; and wherein the detector is operative for detecting variations from the initial value of the beam intensity and for changing the initial value of the drive frequency in response to detecting the variations.

7. The arrangement of claim 4, wherein the RF frequency is set by a tuning circuit, and wherein the detector generates a control signal for impedance tuning the tuning circuit.

8. The arrangement of claim 4, wherein the RF frequency is set by a voltage controlled oscillator, and wherein the detector generates a control signal for controlling the voltage of the oscillator.

9. An arrangement for electronically aligning a laser beam with an acousto-optical modulator (AOM), comprising:
   a) means for directing the laser beam at an incident angle relative to a longitudinal axis of the AOM for exit from the AOM as a zero order beam having a beam intensity;
   b) an acoustic drive for conducting to the AOM an acoustic drive signal having a drive amplitude and a drive frequency to generate in the AOM a plurality of acoustic planar waves for deflecting and diffracting the laser beam incident on the AOM as a first order beam having a beam intensity at a deflection angle relative to the longitudinal axis; and
   c) means for electronically adjusting the incident angle to be a Bragg angle for diffraction efficiency, including a detector for detecting the beam intensity of at least one of the order beams, and for electronically changing the drive frequency of the acoustic drive signal and, in turn, the Bragg angle as a function of the beam intensity detected by the detector, the detector being operative for detecting the beam intensity of the first order beam and stops changing the drive signal when a maximum of the beam intensity of the first order beam is detected.

10. An arrangement for electronically aligning a laser beam with an acousto-optical modulator (AOM), comprising:
   a) means for directing the laser beam at an incident angle relative to a longitudinal axis of the AOM for exit from the AOM as a zero order beam having a beam intensity;
   b) an acoustic drive for conducting to the AOM an acoustic drive signal having a drive amplitude and a drive frequency to generate in the AOM a plurality of acoustic planar waves for deflecting and diffracting the laser beam incident on the AOM as a first order beam having a beam intensity at a deflection angle relative to the longitudinal axis, the acoustic drive including a radio frequency (RF) generator for generating the drive frequency of the acoustic drive signal as an RF frequency of an RF drive signal;
   c) means for electronically adjusting the incident angle to be a Bragg angle for diffraction efficiency, including a detector for detecting the beam intensity of at least one of the order beams, and for electronically changing the drive frequency of the acoustic drive signal and, in turn, the Bragg angle as a function of the beam intensity detected by the detector; and
   d) a video source for mixing a video signal with the RF drive signal for modulating the drive amplitude and, in turn, for modulating the beam intensity of the first order beam.

11. A method of electronically aligning a laser beam with an acousto-optical modulator (AOM), comprising the steps of:
   a) directing the laser beam at an incident angle relative to a longitudinal axis of the AOM for exit from the AOM as a zero order beam having a beam intensity;
   b) conducting to the AOM an acoustic drive signal having a drive amplitude and a drive frequency to generate in the AOM a plurality of acoustic planar waves for deflecting and diffracting the laser beam incident on the AOM as a first order beam having a beam intensity at a deflection angle relative to the longitudinal axis; and
   c) electronically adjusting the incident angle to be a Bragg angle for diffraction efficiency, including the steps of detecting the beam intensity of at least one of the order beams, and electronically changing the drive frequency of the acoustic drive signal and, in turn, the Bragg angle as a function of the detected beam intensity, the detecting step being performed by detecting the beam intensity of the zero order beam, and wherein the changing step stops changing the drive frequency when a minimum of the beam intensity of the zero order beam is detected.

12. The method of claim 11, wherein the directing step is performed by a laser for emitting the laser beam at a wavelength corresponding to a green color.

13. The method of claim 11, wherein the Bragg angle is linearly related to the drive frequency of the acoustic drive signal.

14. The method of claim 11, and the steps of setting the drive frequency to an initial value and detecting an initial value of the beam intensity of the at least one of the beams in order to set the incident angle as the Bragg angle; and wherein the adjusting step includes detecting variations from the initial value of the beam intensity, and changing the initial value of the drive frequency in response to detecting the variations.

15. method of electronically aligning a laser beam with an acousto-optical modulator (AOM), comprising the steps of:
   a) directing the laser beam at an incident angle relative to a longitudinal axis of the AOM for exit from the AOM as a zero order beam having a beam intensity;
   b) conducting to the AOM an acoustic drive signal having a drive amplitude and a drive frequency to generate in the AOM a plurality of acoustic planar waves for deflecting and diffracting the laser beam incident on the AOM as a first order beam having a beam intensity at a deflection angle relative to the longitudinal axis; and
   c) electronically adjusting the incident angle to be a Bragg angle for diffraction efficiency, including the steps of detecting the beam intensity of at least one of the order beams, and electronically changing the drive frequency of the acoustic drive signal and, in turn, the Bragg angle as a function of the detected beam intensity, the detecting step being performed by detecting the beam intensity of the first order beam, and wherein the changing step stops changing the drive signal when a maximum of the beam intensity of the first order beam is detected.

16. The arrangement of claim 9, wherein the directing means includes a laser for emitting the laser beam at a wavelength corresponding to a green color.

17. The arrangement of claim 16, wherein the laser is a frequency-doubled, infrared laser.

18. The arrangement of claim 9, wherein the acoustic drive includes a radio frequency (RF) generator for generating the drive frequency of the acoustic drive signal as an RF frequency of an RF drive signal.

19. The arrangement of claim 9, wherein the Bragg angle is linearly related to the drive frequency of the acoustic drive signal.

20. The arrangement of claim 9, wherein the drive frequency is set to an initial value; wherein the detector is operative for detecting an initial value of the beam intensity of the at least one of the beams; wherein the initial values set the incident angle as the Bragg angle; and wherein the detector is operative for detecting variations from the initial value of the beam intensity and for changing the initial value of the drive frequency in response to detecting the variations.

21. The arrangement of claim 20, wherein the RF frequency is set by a tuning circuit, and wherein the detector generates a control signal for impedance tuning the tuning circuit.

22. The arrangement of claim 20, wherein the RF frequency is set by a voltage controlled oscillator, and wherein the detector generates a control signal for controlling the voltage of the oscillator.

23. The arrangement of claim 18, wherein a video source for mixing a video signal with the RF drive signal for modulating the drive amplitude and, in turn, for modulating the beam intensity of the first order beam.

* * * * *